US008997818B2

(12) United States Patent
Vaniglia et al.

(10) Patent No.: US 8,997,818 B2
(45) Date of Patent: Apr. 7, 2015

(54) DEVICE FOR FABRICATING A COMPOSITE STRUCTURE

(71) Applicant: Fives Machining Systems, Inc., Fond du Lac, WI (US)

(72) Inventors: Milo M. Vaniglia, Cold Spring, KY (US); James S. Ritchie, Sr., Hillsboro, OH (US)

( * ) Notice: Subject to any disclaimer, the term of this patent is extended or adjusted under 35 U.S.C. 154(b) by 228 days.

(21) Appl. No.: 13/778,869

(22) Filed: Feb. 27, 2013

(65) Prior Publication Data
US 2014/0238612 A1  Aug. 28, 2014

(51) Int. Cl.
*B29C 70/38* (2006.01)
*B29C 70/30* (2006.01)
*B29C 70/54* (2006.01)

(52) U.S. Cl.
CPC .............. *B29C 70/30* (2013.01); *B29C 70/545* (2013.01); *B29C 70/384* (2013.01)

(58) Field of Classification Search
CPC .................................................. B29C 70/384
USPC .................. 156/425, 441, 433, 523, 574, 430
See application file for complete search history.

(56) References Cited

U.S. PATENT DOCUMENTS

| | | | |
|---|---|---|---|
| 4,699,683 A | 10/1987 | McCowin | |
| 4,907,754 A * | 3/1990 | Vaniglia | 156/425 |
| 5,979,531 A | 11/1999 | Barr et al. | |
| 6,968,883 B2 * | 11/2005 | Torres Martinez | 156/425 |
| 7,472,736 B2 | 1/2009 | Kisch et al. | |
| 7,681,615 B2 | 3/2010 | McCowin | |
| 7,785,433 B2 | 8/2010 | Kisch et al. | |
| 8,012,291 B2 | 9/2011 | Kisch et al. | |
| 8,057,618 B2 | 11/2011 | Hamlyn | |
| 8,147,637 B2 | 4/2012 | Kisch et al. | |
| 8,151,854 B2 | 4/2012 | Oldani | |
| 8,205,532 B2 | 6/2012 | DeVlieg et al. | |
| 8,256,484 B2 | 9/2012 | Kisch et al. | |
| 2007/0044896 A1 | 3/2007 | Tingley | |
| 2010/0200168 A1 | 8/2010 | Oldani et al. | |
| 2011/0315325 A1 | 12/2011 | Kisch et al. | |

(Continued)

FOREIGN PATENT DOCUMENTS

| | | |
|---|---|---|
| EP | 1342555 A1 | 9/2003 |
| FR | 2915703 A1 | 11/2008 |

(Continued)

OTHER PUBLICATIONS

EP 14152647.5 Extended European search report and Examination; 5 pages; dated Jun. 17, 2014.

*Primary Examiner* — Jeff Aftergut
(74) *Attorney, Agent, or Firm* — Reising Ethington P.C.

(57) ABSTRACT

A device for fabricating a composite structure comprises a multi-axis positioner and an attached end effector comprising an integrated head and creel. The head has a clamp, cut and restart mechanism and a compaction roller with a rotary axis. The creel has a prismatic shape with a coupling device on the top of the creel for attachment to the multi axis positioner and a centerline which passes through the center of the creel and intersects the axis of rotation of the compaction roller. A composite placement head is attached to the bottom of the creel. A plurality of composite material supply spools are mounted on the sides of the creel and face outward from the creel. A plurality of rollers are mounted on the outside surface of the creel for directing the composite material from the supply spools to the fiber placement head.

13 Claims, 8 Drawing Sheets

(56) References Cited

U.S. PATENT DOCUMENTS

| | | |
|---|---|---|
| 2012/0035754 A1 | 2/2012 | Oldani |
| 2012/0090788 A1 | 4/2012 | Oldani et al. |
| 2012/0138232 A1 | 6/2012 | Kisch et al. |
| 2012/0241093 A1 | 9/2012 | Borgmann |
| 2013/0032287 A1 | 2/2013 | Hagman et al. |

FOREIGN PATENT DOCUMENTS

| | | |
|---|---|---|
| FR | 2919517 A1 | 2/2009 |
| WO | 2008149004 A1 | 12/2008 |

* cited by examiner

DEVICE FOR FABRICATING A COMPOSITE STRUCTURE

FIELD

The device relates to a multi-axis positioner with a quick release integrated composite placement head and creel in which the creel is a cube with material spindles on four sides that are perpendicular to the sides of the cube and to the creel centerline.

BACKGROUND

Composite materials are increasingly being used for the manufacture of precision parts where strength and low weight are desired characteristics. Composite material may take the form of slit tape or tow in one-eighth inch, one-quarter inch, and one-half inch widths, depending on the surface that is being laid-up. Ideally, a manufacturer would like to use a variety of tow widths on a part, but the cost of multiple machines to lay-up several widths of tow on the same part makes such an approach cost prohibitive. One solution is to use the same positioner with different heads and to couple the replacement heads with different sizes of tow, but rethreading the machine and the head takes a significant amount of time, making this approach impractical.

It would accordingly be desirable to provide an integrated head and creel that could be quickly mounted on a positioner in order to lay up a desired size of tow in a time and cost efficient manner.

OBJECTS

It is an object of the invention to provide a positioning device and an end effector in which a quick release coupler is mounted to the top of the end effector for attachment to the positioning device.

It is another object of the invention to provide an end effector comprising an integrated head and creel in which a quick release coupler is mounted on the top of the creel for attachment to a positioning device and a fiber delivery system mounted to the bottom of the creel that delivers tows to a compaction device.

It is an additional object of the invention to provide an end effector comprising a cube shaped creel having tow feed spools mounted on four sides of the cube in a manner to establish their unwind rotation axis perpendicular to the head centerline.

It is yet another object of the invention to provide an end effector having an integrated head and creel in which tow feed spools are arranged on four sides of the creel above a compaction device such that they are perpendicular to the head centerline in a manner that optimizes the ability of the compaction device to apply tows to a tool.

SUMMARY DESCRIPTION

An end effector is mounted on a positioning device that performs a composite layup process. The end effector comprises an integrated head and creel with tow feed spools arranged above a compaction device such that they are perpendicular to head centerline in order to optimize the ability of the compaction device to apply tows to a tool. The end effector comprises a cube shaped housing in which the tow feed spools are mounted on the four sides of the cube in order to establish their unwind rotation axis perpendicular to the head centerline. The end effector further comprises a fiber delivery system that delivers the tows to the compaction device mounted on the bottom side of the cube. A quick release coupler mounted to the top side of the cube attaches the end effector to the positioning device.

DESCRIPTION OF THE PREFERRED EMBODIMENT

Figure 1:
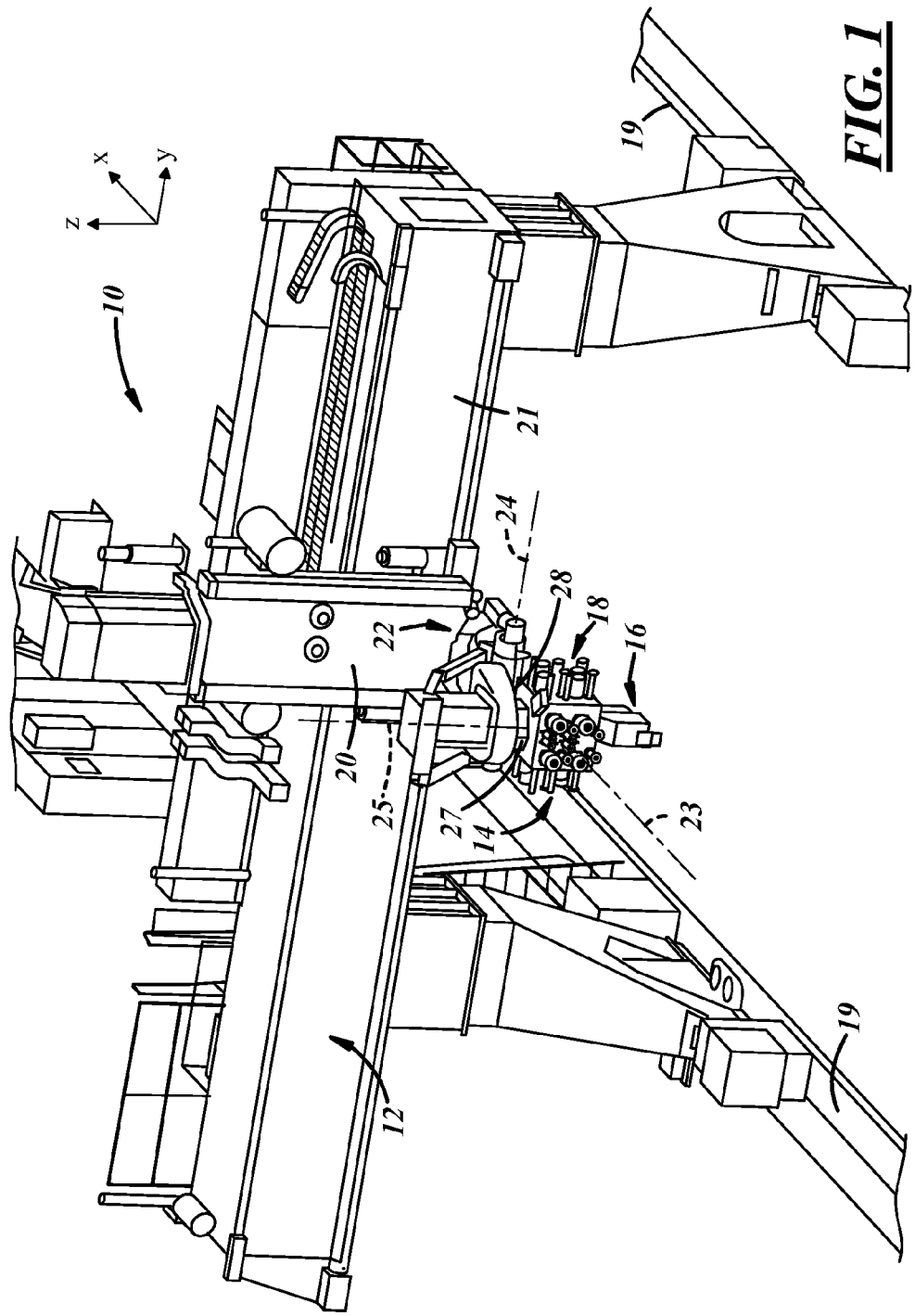
FIG. 1 is a perspective view of a composite placement device comprising a gantry positioner with an integrated head and creel.

Turning now to the drawing figures, FIG. 1 is perspective view of a composite placement device 10 comprising a positioning device 12 and an end effector 14 comprising an integrated head 16 and creel 18. The positioning device 12 is a multi-axis positioner such as a six-axis gantry machine. The gantry is able to move in the X-axis along the rails 19, the gantry column 20 is able to move in the Y-axis across the gantry beam 21, and the gantry column 20 is able to move up and down in the Z-axis, thus giving the end effector 14 motion in the X, Y, and Z-axes. A wrist mechanism 22 is coupled to the lower end of the column 20, and supports the end effector 14. The wrist mechanism 22 allows the end effector to pivot about an I-axis 23 that is parallel to the X-axis, a J-axis 24 that is parallel to the Y-axis, and a K-axis 25 that is parallel to the Z-axis. A quick disconnect coupler 27 may be mounted between the wrist mechanism 22 and the top surface 28 of the end effector 14 at the bottom of the sixth axis of the wrist mechanism 22, the K-axis 25. Instead of a six-axis gantry machine, the positioning device 12 may also comprise tilt-crossfeed machine, either with or without a quick disconnect coupler 27 mounted between end effector 14 and the positioning device 12.

Figure 2:
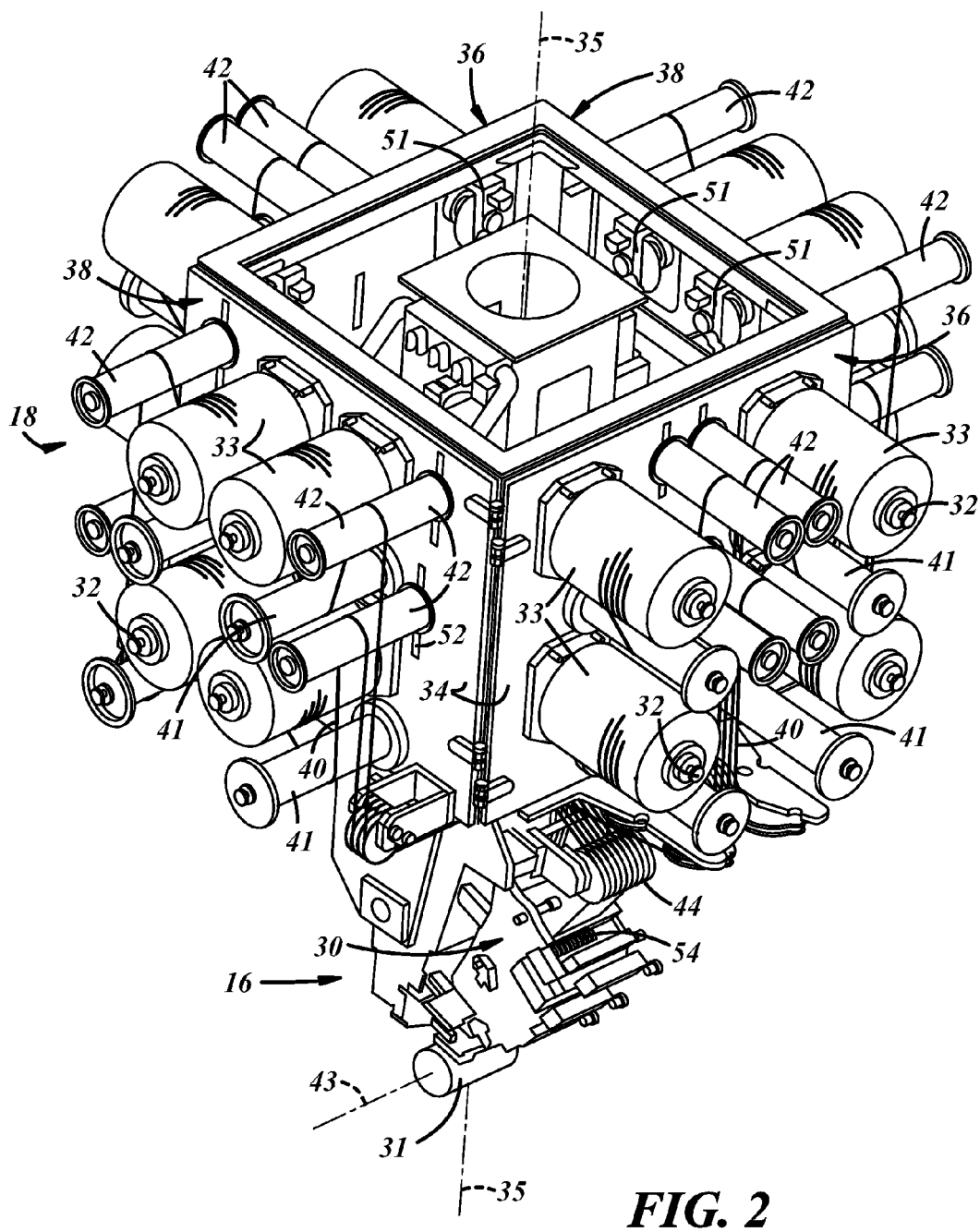
FIG. 2 is a top perspective view of the creel and a composite placement head.

FIG. 2 is a perspective view of the creel 18 and the composite placement head 16. The creel 18 is prismatic shaped and may be in the shape of a square cube as shown, with a height that is equal to its length and width. The head 16 is mounted on the bottom of the creel 18, and includes a Cut-Clamp-Restart Mechanism (CCRM) 30, and a compaction roller 31 having an axis of rotation 43. In other embodiments, the creel may be a rectangular cube with the height, length and width dimensions being different from each other.

Supply spindles 32 with spools 33 of composite material or tow 40 are mounted facing outward on the four vertical sides 34 of the creel, with the rotation axis of the spindles 32 and spools 33 being perpendicular to centerline 35 of the creel. The centerline 35 of the creel is coincident with the K-axis 25 of the wrist mechanism, the 6th axis of the positioner. The four sided creel design offers a compact, light weight spool and spindle mounting matrix that establishes a small head swing radius for greater wrist travel, dexterity and mold clearance.

The creel 18 has two types of spool/spindle mounting faces, a center-pull face 36 and outer-pull face 38, each which holds four supply spools 33 of composite material, thus the creel on all four sides holds sixteen spools in total. The two center-pull faces 36 are on two opposite sides of the creel 18 and the two outer-pull faces 38 are on the remaining two opposite sides of the creel. The tow feed spools 33 are arranged on the faces of the creel 18 such that the axes of the spools are perpendicular to the faces of the creel on which they are mounted and to the head centerline 35. An interleaver take up spool 41 that winds up the paper interlayer between layers of tow 40 on the supply spools, and a dancer roller 42 is provided for each supply spindle 32. The mounting of the supply spindles 32, the interleaver spindles 41, and the dancer rollers 42 on the outside of the creel allows a brake mechanism 51 for tow payout speed governing and the electric utilities to be mounted on the inside of the creel. Other numbers of spindles and spindle mounting patterns on a prismatic shaped creel are possible.

Figure 3:
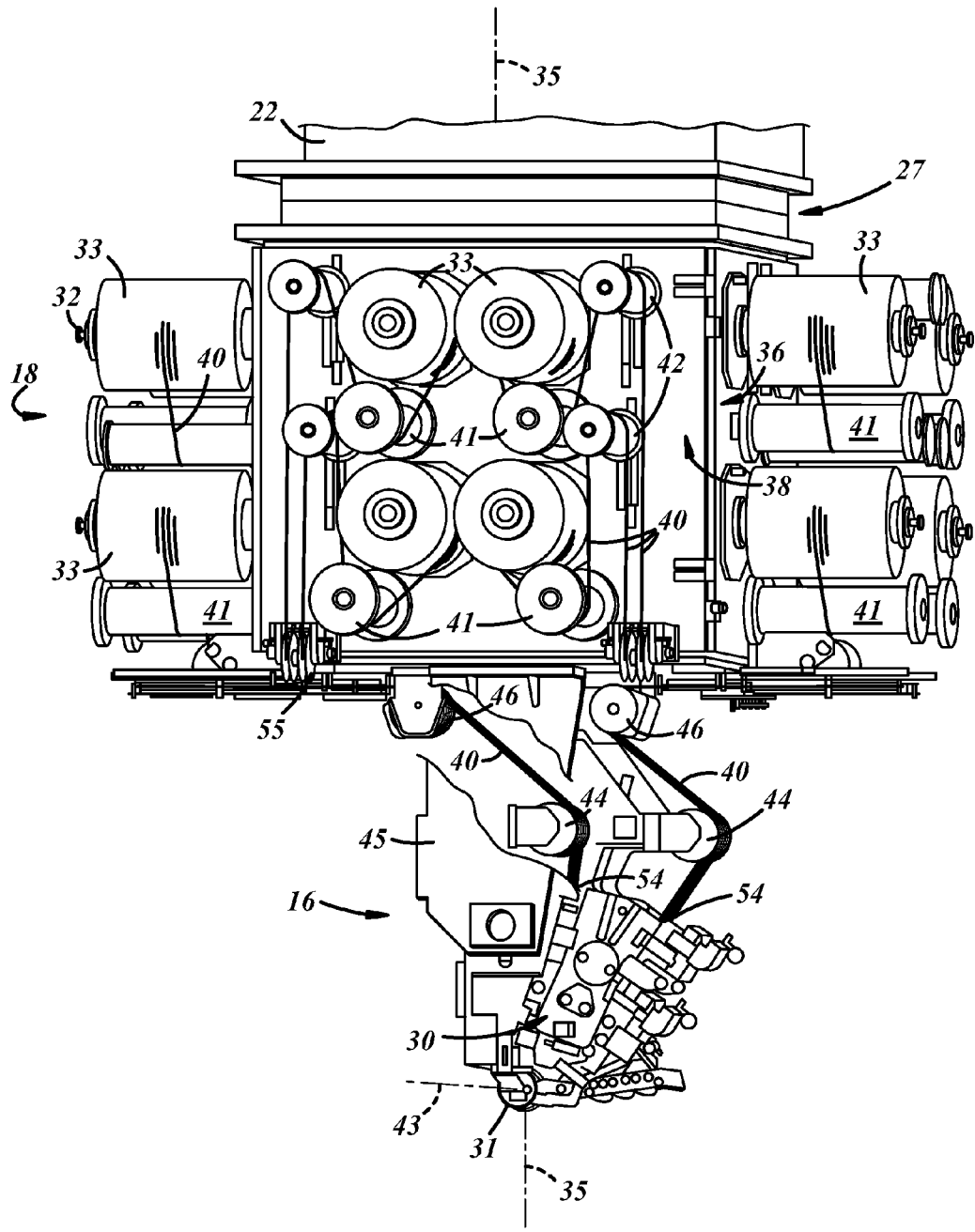
FIG. 3 is side view of the creel and the composite placement head.
Figure 4:
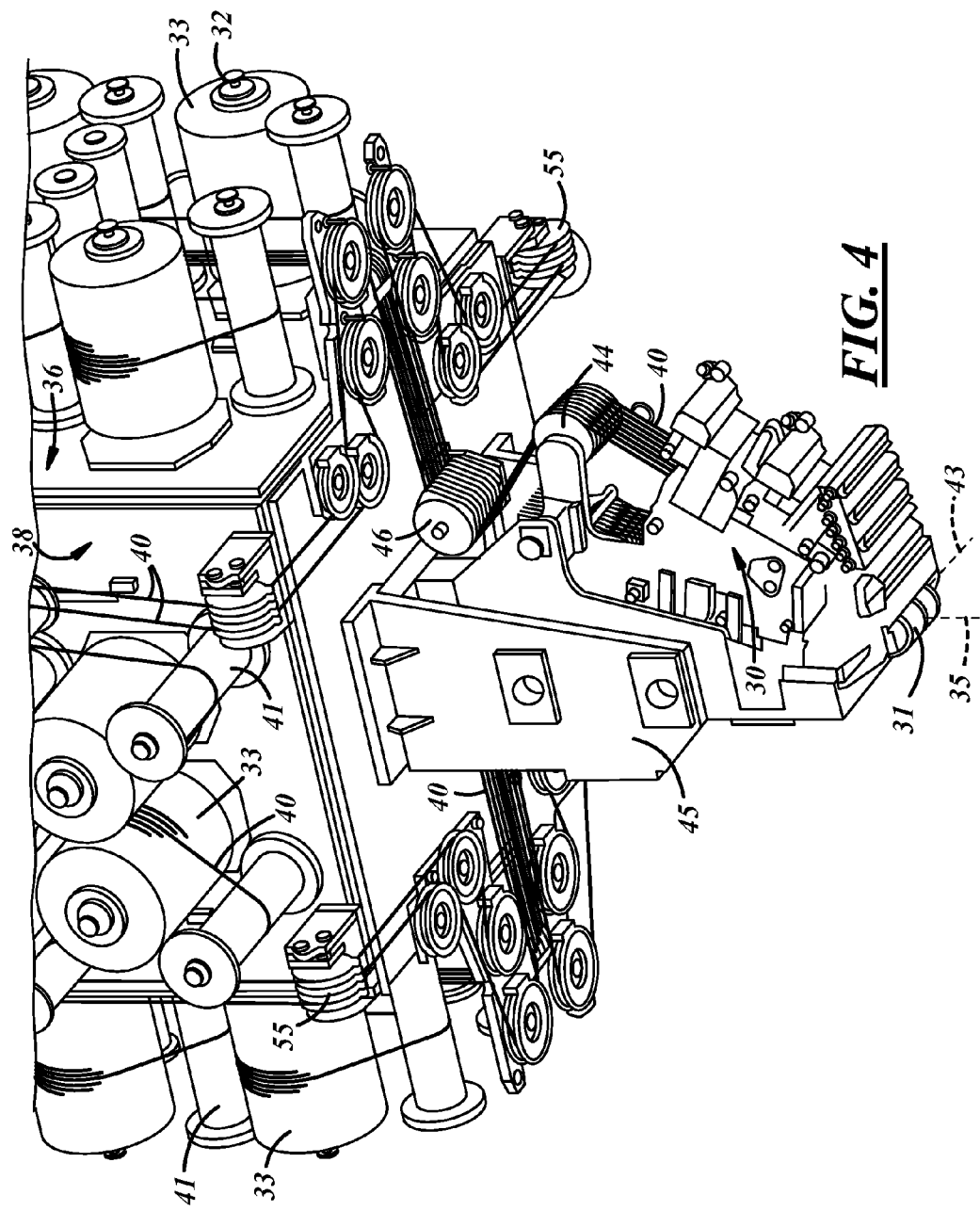
FIG. 4 is a perspective view showing the underside of the creel and the fiber placement head.

FIG. 3 is side view of the creel 18 and the composite placement head 16, and FIG. 4 is a perspective view showing the underside of the creel 18 and the fiber placement head. The head 16 is mounted directly on the bottom of the creel 18, opposite the quick release coupling 27 that is mounted on the top of the creel, and attaches the creel to the bottom of the 6$^{th}$ axis of the wrist 22. The centerline 35 of the creel is centrally located relative to the faces 36,38 of the creel, and the centerline intersects the axis of rotation 43 of the compaction roller 31. A plurality of rollers are mounted on the outside surface of the creel 18 for directing the composite material from the supply spools 33 to the fiber placement head 16 on the bottom of the creel as explained more fully below. The mounting bracket 45, which houses a compactor slide assembly which itself houses the CCRM 30, is broken away in FIG. 4 to show the path of the tow 40 between the bottom center redirect rollers 46 on the bottom of the creel and the CCRM redirect rollers 44.

Figure 5:
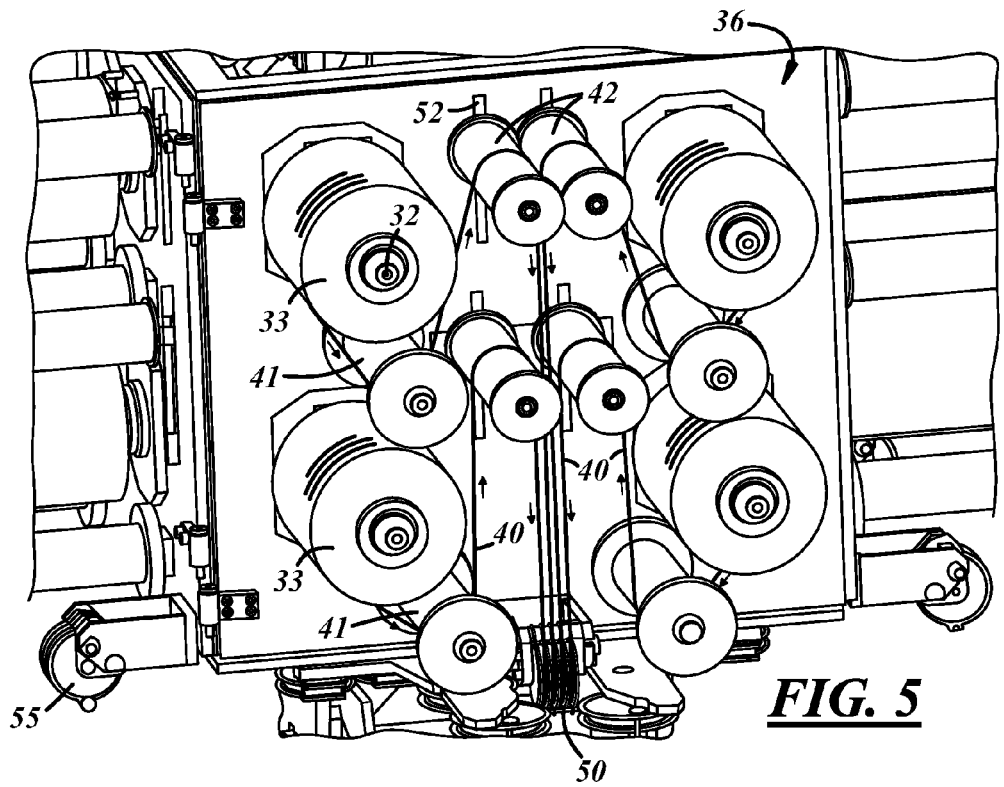
FIG. 5 is a detail view of a center pull face of the creel.

FIG. 5 is a detail view of a center-pull face 36 of the creel. On the center-pull face 36, tow 40 from an array of supply spindles 33 wraps around the interleaver spools 41 to have the paper liner removed from the tow, and the tow is then directed to the dancer rollers 42. The dancer rollers 42 are positioned in the center of the array of supply spindles 32, and deliver the four tows 40 to the center of the face 36. The group of four tows 40 is directed down the center pull face 36 to four center cube-edge redirect rollers 50 for a 90 degree turn over the bottom edge of the creel 18.

A passive tensioner mechanism controls the payout of the tow from the supply spools 33 and is formed by the tow supply spool spindle 32, the interleaver take-up spindle 41, the dancer roller 42, and a mechanical brake 51 that is mounted on the back of the supply spool spindle 32, inside of the creel as shown in FIG. 2. The passive tensioner mechanism measures the acceleration and deceleration motion of the dancer roller 42 and adjusts the force on the mechanical brake 51 accordingly. Each dancer roller 42 is mounted in slideable mount in a way 52 and is able to translate linearly in response to the tension on the tow 40. The motion of the dancer roller 42 is sensed and used to adjust the force on the mechanical brake 51 on the supply spool spindles 32 to control the tow payout tension.

Figure 6:
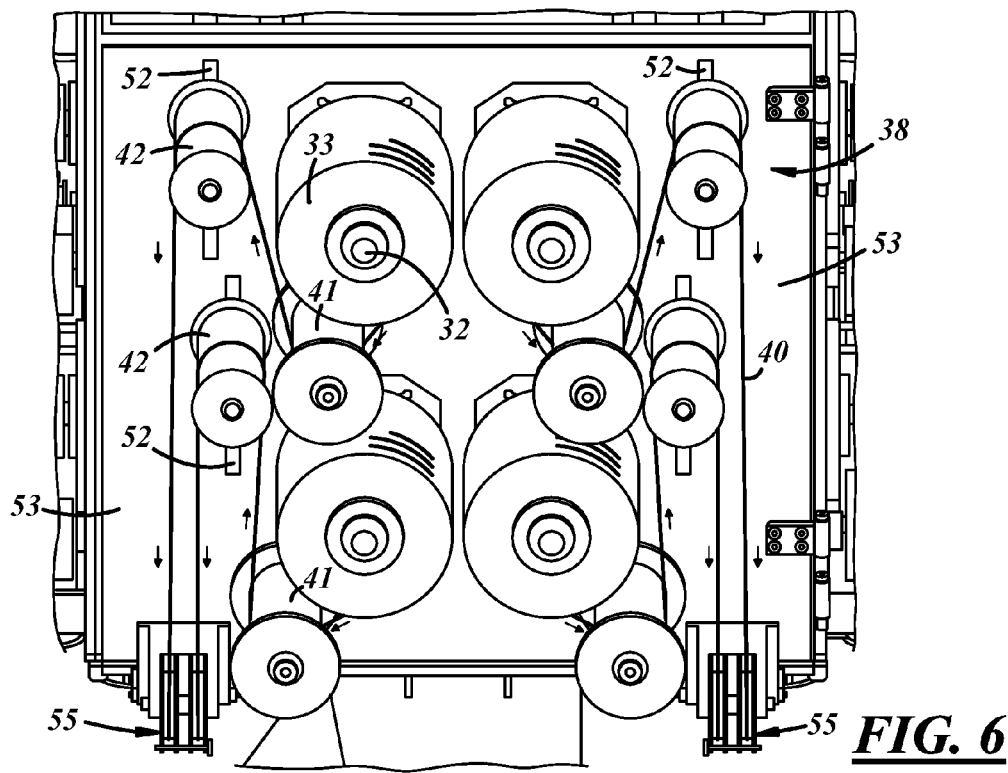
FIG. 6 is a detail view of an outer pull face of the creel.

FIG. 6 is a detail view of an outer-pull face 38 of the creel. On the outer-pull faces 38 of the creel, the dancer rollers 42 are arranged on the outside of the array of four supply spools 33. Tow 40 from the supply spools 33 on the outer-pull faces 38 wrap around the interleaver spools 41 where the paper liner is removed from the tow, and the tow is then directed to the dancer rollers 42. The dancer rollers 42 on each side of the array of supply spools 33 deliver two tows to the two outside edges 53 of each face 38. The dancer rollers 42 collimate the two twin tow bands at each outer edge 53 and feed the tow bands to the outside-cube-edge redirect rollers 55 on the bottom corner edge of the cube for the 90 degree turn over the bottom edge of the cube.

Figure 7:
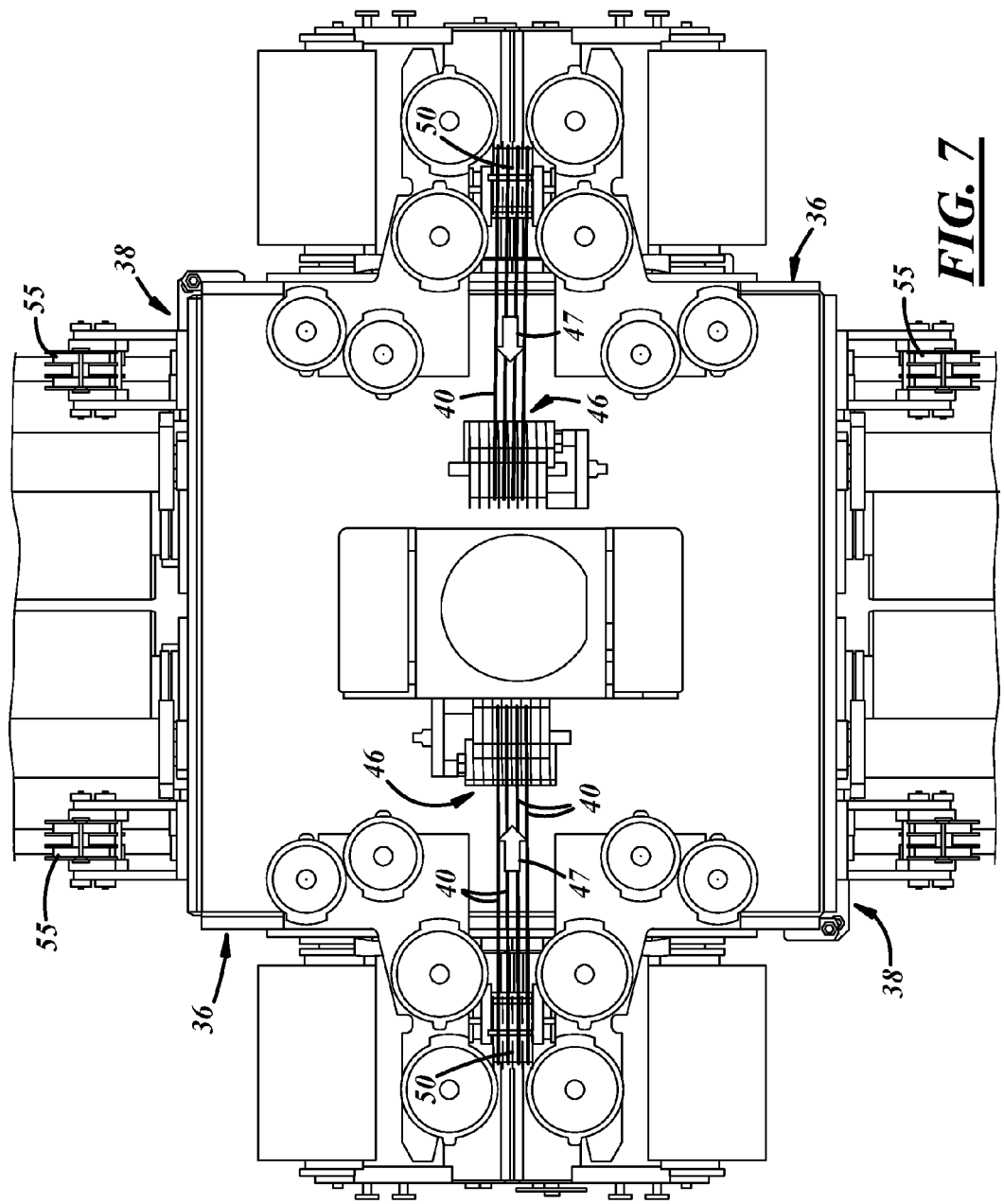
FIG. 7 is a detail view of the underside of the creel showing the fiber delivery path for the fibers from the center pull faces of the creel.

FIG. 7 is a detail view of the underside of the creel 18 showing the fiber delivery path for the fibers from the center-pull faces 36. The preferred alignment 47 for the tow 40 as it enters the bottom center redirect rollers 46 is in the plane of the individual redirect rollers that will receive the tow and perpendicular to the axis of rotation of the bottom center redirect rollers. The tows 40 from the center-cube-edge redirect rollers 50 are in alignment with the preferred alignment 47 as the tow enters the four center rollers of the bottom-center-redirect rollers 46. The bottom center redirect rollers 46 direct the tow to the CCRM redirect rollers 44 which are above the CCRM entrance channels 54 on the head as best seen in FIG. 3.

Figure 8:
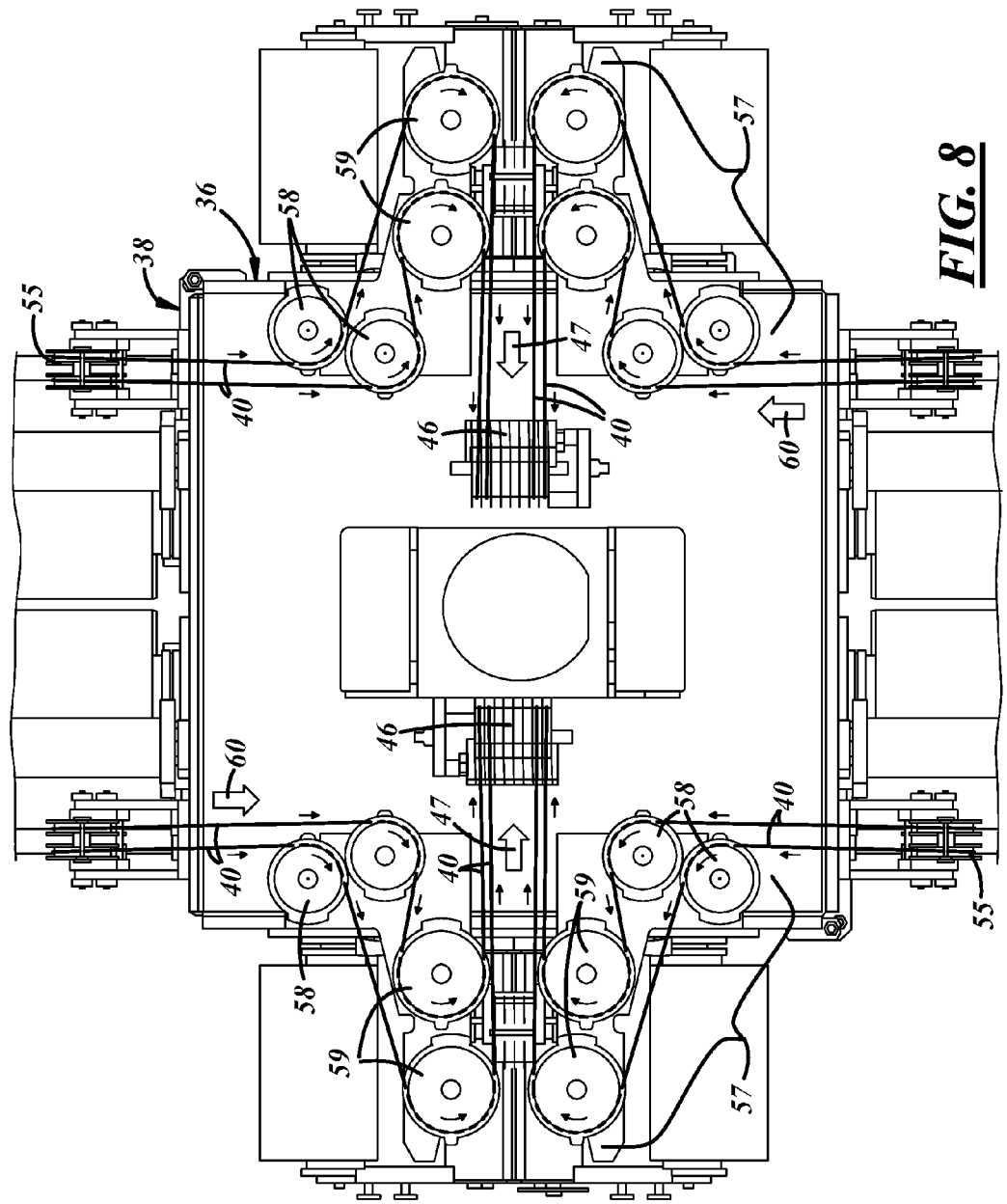
FIG. 8 is a detail view of the underside of the creel showing the fiber delivery path for the fibers from the outer pull faces of the creel.

FIG. 8 is a detail view of the underside of the creel showing the fiber delivery path for the fibers from the outer-pull faces 38. The tow from the outside-cube-edge redirect rollers 55 is in a path 60 that is perpendicular to the preferred alignment 47 for the tow entering the bottom center redirect rollers 46. The tow from the outside-cube-edge redirect rollers 55 is directed to a bottom flat planar redirect roller set 57 to be redirected to the bottom-center-redirect rollers 46. The bottom flat planar redirect roller set 57 comprises off-axis planar redirect rollers 58 and on-axis planar redirect rollers 59. The off-axis planar redirect rollers 58 direct the tow from the outside-cube-edge redirect rollers 55 to the on-axis planar redirect rollers 59. The on-axis planar redirect rollers 59 arrange the tow 40 into parallel paths in alignment with the preferred alignment 47 for the tow entering the bottom center redirect rollers 46, perpendicular to the axis of rotation and in the plane of the bottom-center redirect rollers 46. From the bottom-center redirect rollers 46, the tow from the outer-pull faces are directed to the CCRM redirect rollers 44 which are above the CCRM entrance channels 54 on the head as best seen in FIG. 3.

Furthermore, when converting or changing over from one tow size to another tow size, adjustments to some of the rollers may be needed to accommodate the size change. For example, when changing over from a one-quarter inch width tow to a one-half inch width tow, both of the upper and lower sets of dancer rollers 42 on the center-pull faces 36 are re-spaced laterally outwardly away from each other so that there is a total of approximately one-inch distance between adjacent dancer rollers. This provides room for the larger size tow. Likewise, the on-axis planar redirect rollers 59 on the underside of the creel 18 can be re-spaced to a similar extent to accommodate the larger size tow. Different mechanical set-ups and constructions can provide the re-spacing capability. In one example, bolted dovetail mountings of the rollers can be loosened and moved for making the tow size change.

In one embodiment, the center-pull faces 36 may be positioned offset with respect to each other in order to provide suitable interleaving of the respective tow 40 coming from opposite center-pull faces. For example, for one-quarter inch width tow, one of the center-pull faces 36 is offset approximately one-eighth inch from the centerline 35 in a first direction, while the other center-pull face 36 is offset approximately one-eighth inch from the centerline 35 in a second direction opposite the first direction. These offsets yield a total of approximately one-quarter inch lateral distance of offset between the center-pull faces 36 relative to each other so that their respective tows 40 can interleave one another downstream the center-pull faces.

Figure 9:
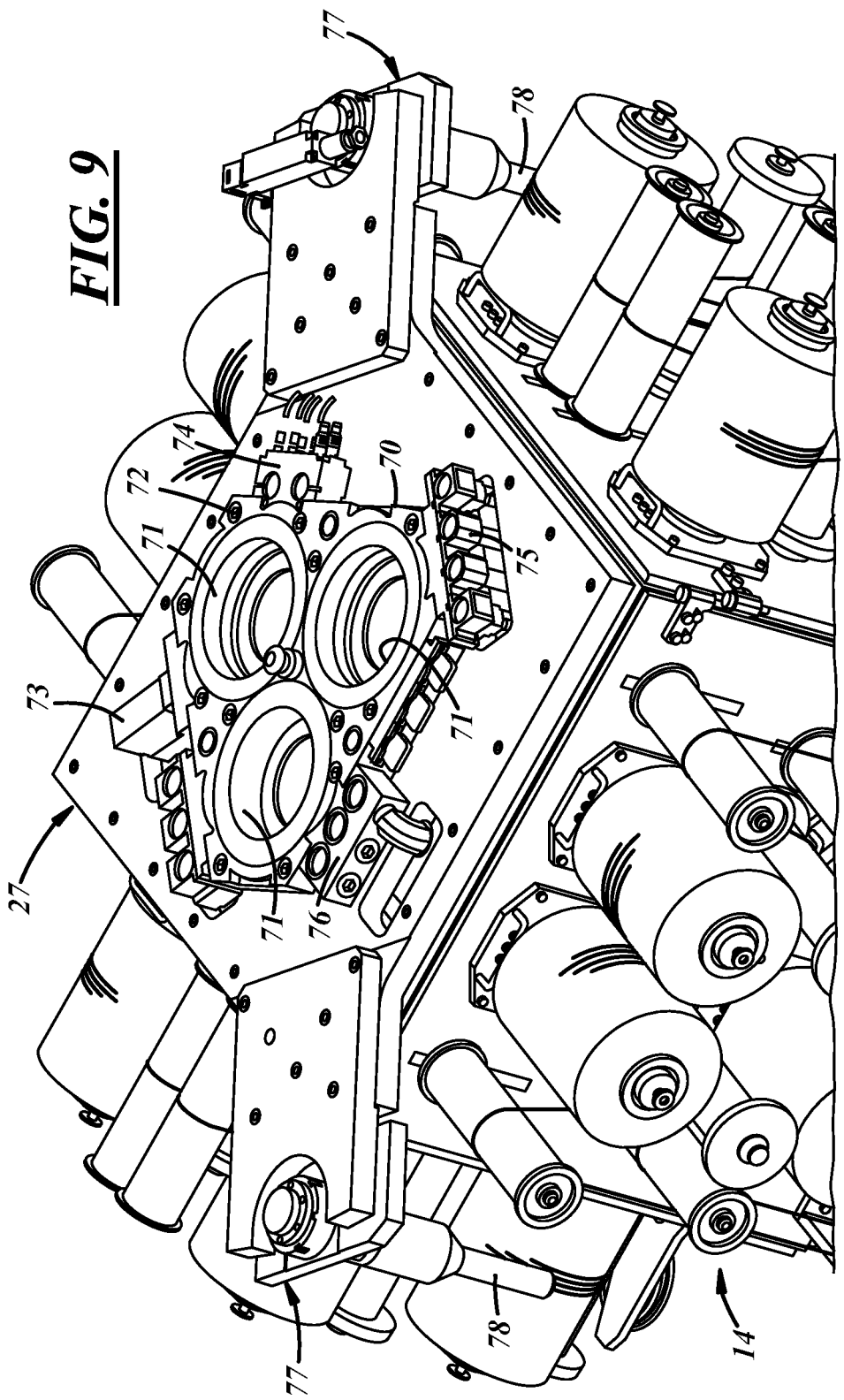
FIG. 9 is a top perspective view of a quick release coupler.

FIG. 9 is a top perspective view of components of the quick disconnect coupler 27 that may be used to attach the end effector 14 to the wrist mechanism 22. The quick disconnect coupler 27 shown is just one embodiment of such a coupler, as other embodiments are possible. Here, the quick disconnect coupler 27 has a housing 70 for supporting its other components, and has three female locking rings 71 for mating and securement with three complementary male ring components of the wrist mechanism 22. Each of the female locking rings 71 has a radially-inwardly extending ledge that is engaged by outwardly-expanding balls of the respective male ring component upon piston actuation thereof in order to secure the end effector 14 to the wrist mechanism 22. Bolts 72 are used as an attachment between the quick disconnect coupler 27 and the creel 18; in FIG. 9, a total of fourteen bolts are provided. A number of modules facilitate communication and connection among the quick disconnect coupler 27, the wrist mechanism 22, and the end effector 14. In this embodiment, the modules include a servo module 73, a communications module 74, four low current power modules 75, and three air module ports 76. Lastly, the quick disconnect coupler 27 also includes a pair of oppositely located dock stand assemblies 77 that assist stowing of the end effector 14 in a dock station when it is unattached from the wrist mechanism 22. Each dock stand assembly 77 has a support rod 78 extending from a bracket for insertion into a stand assembly.

The four sided creel design offers several advantages. Mold clearance is enhanced since the cube shaped creel can be used in a smaller swing radius than other creel shapes with same number of spools. Other creel shapes such as flat and rectangular, or circular requires more maneuvering space when the head is close to the mold surface. The supply spindles extending outwardly from the sides of the creel enable easy threading and access to the CCRM 30. The head and the CCRM are located on the bottom of the creel where it is accessible for maintenance and repair.

Having thus described the device, various modifications and alterations will occur to those skilled in the art, which modifications and alterations are intended to be within the scope of the device as defined by the appended claims.

The invention claimed is:

1. A device for fabricating a composite structure comprising:
    a multi-axis positioner and an attached end effector;
    an integrated head and creel comprising the end effector;
    the head having a clamp, cut and restart mechanism (CCRM) and a compaction roller having a rotary axis, the head being attached to the bottom of the creel;
    the creel having a prismatic shape with a coupling device on the top of the creel for attachment to the multi-axis positioner, the creel having a centerline which passes through the center of the creel and intersects the axis of rotation of the compaction roller;
    a plurality of composite material supply spools mounted on the sides of the creel and facing outward from the creel;
    a plurality of rollers mounted on the outside surface of the creel for directing the composite material from the supply spools to the fiber placement head on the bottom of the creel.

2. The device of claim 1 further comprising:
    dancer rollers mounted on the sides of the creel;
    the dancer rollers on some of the sides of the creel being mounted in the center of an array of spindle supply spools and the dancer rollers on the remaining sides of the creel being mounted on the outside of an array of spindle supply spools;
    rollers on the bottom edge of the creel for redirecting composite material from the sides of the creel to the bottom of the creel; and,
    rollers on the bottom of the creel for redirecting the composite material from the bottom of the creel to the CCRM of the head.

3. The device of claim 1 further comprising:
    an array of supply spindles mounted on a center pull face of the creel;
    four dancer rollers mounted in the center of the array of supply spindles mounted on the center pull face of the creel;
    four center cube edge redirect rollers mounted in the center of the bottom edge of the creel; and,
    four bottom center redirect rollers mounted on the bottom of the creel, wherein the bottom center redirect rollers direct composite material from the center pull face of the cube to the CCRM redirect rollers of the head.

4. The device of claim 3 further comprising:
    an array of four supply spindles mounted on an outer-pull face of the creel;
    four dancer rollers mounted on the outside of the array of four supply spindles mounted on the outer pull face of the creel;
    two outside cube edge redirect rollers mounted on the two corner bottom edges of the creel; and,
    a bottom flat planar redirect roller set mounted on the bottom of the creel, wherein the bottom flat planar redirect roller set directs the composite material from the two outside cube edge redirect rollers in a direction of travel that is perpendicular to the preferred alignment for the tow into the bottom center redirect rollers, wherein the bottom center redirect rollers direct the composite material to the CCRM of the head.

5. The device of claim 1 where the creel is a cube shaped.

6. The device of claim 1 wherein the positioner has a 6th axis of rotation that is in alignment with the centerline of the head and intersects with the axis of rotation of the compactor.

7. The device of claim 2 further comprising:
    a slideable mount for each of the dancer rollers, wherein the position of the dancer rollers changes in response to the acceleration and deceleration forces of the composite material on the dancer rollers.

8. The device of claim 4 further comprising:
    off-axis planar redirect rollers and on-axis planar redirect rollers comprising the bottom flat planar redirect roller set, the on-axis planar redirect rollers aligning the composite material so that it is perpendicular to the axis of rotation of the bottom center redirect rollers.

9. The device of claim 4 wherein the path of travel of the composite material exiting the outside edge redirect rollers is perpendicular to the path of travel of the composite material as it enters the bottom center redirect rollers.

10. The device of claim 9 wherein the path of travel of the composite material as it exits the on-axis planar redirect rollers is in alignment with the preferred alignment for the composite material entering the bottom center redirect rollers.

11. The device of claim 3 wherein the path of travel of the composite material as it exits the center cube edge redirect rollers is in alignment with preferred alignment for the composite material entering the bottom center redirect rollers.

12. The device of claim 4 wherein the creel has two center pull faces and two outside pull faces.

13. The device of claim 12 wherein the center pull faces are on opposite sides of the creel and the outside pull faces are on opposite sides of the creel.

* * * * *